United States Patent [19]

Weyermanns et al.

[11] Patent Number: 5,186,019
[45] Date of Patent: Feb. 16, 1993

[54] DEVICE TO FREEZE FREE-FLOWING AND POURABLE SUBSTANCES

[75] Inventors: Gunther Weyermanns, Kempen; Uwe Gorlich, Moers, both of Fed. Rep. of Germany

[73] Assignee: Messer Griesheim GmbH, Fed. Rep. of Germany

[21] Appl. No.: 704,040

[22] Filed: May 22, 1991

[30] Foreign Application Priority Data

May 31, 1990 [DE] Fed. Rep. of Germany ....... 4017565

[51] Int. Cl.$^5$ ............................................. F25D 25/02
[52] U.S. Cl. ........................................ 62/381; 62/346; 165/111
[58] Field of Search ................ 62/381, 346, 63, 64; 165/111

[56] References Cited

U.S. PATENT DOCUMENTS

| | | | |
|---|---|---|---|
| 2,995,016 | 8/1961 | Beattie et al. | 62/346 |
| 3,395,549 | 8/1968 | Grimes | 62/381 |
| 3,992,899 | 11/1976 | Spahn | 62/381 |
| 4,528,819 | 7/1985 | Klee | 62/63 |
| 4,875,344 | 10/1989 | Zittel | 62/381 |
| 4,989,416 | 2/1991 | Miller et al. | 62/63 |

FOREIGN PATENT DOCUMENTS 1125338  10/1956  France .
1433538  4/1976  United Kingdom .

*Primary Examiner*—Ronald C. Capossela
*Attorney, Agent, or Firm*—Connolly & Hutz

[57] ABSTRACT

A device to freeze free-flowing and pourable substances in a bath consists of a bath for a low-boiling liquified gas located inside an insulated housing having openings for the introduction of the substances to be frozen and the gas as well as for the removal of the frozen substances. The bath is located in a rotatable hollow cylinder having a rotational axis tilted with respect to the horizontal plane. The inner wall of the cylinder has a ribbon screw above whose lowest point there is a feed mechanism for the substances to be frozen.

3 Claims, 2 Drawing Sheets

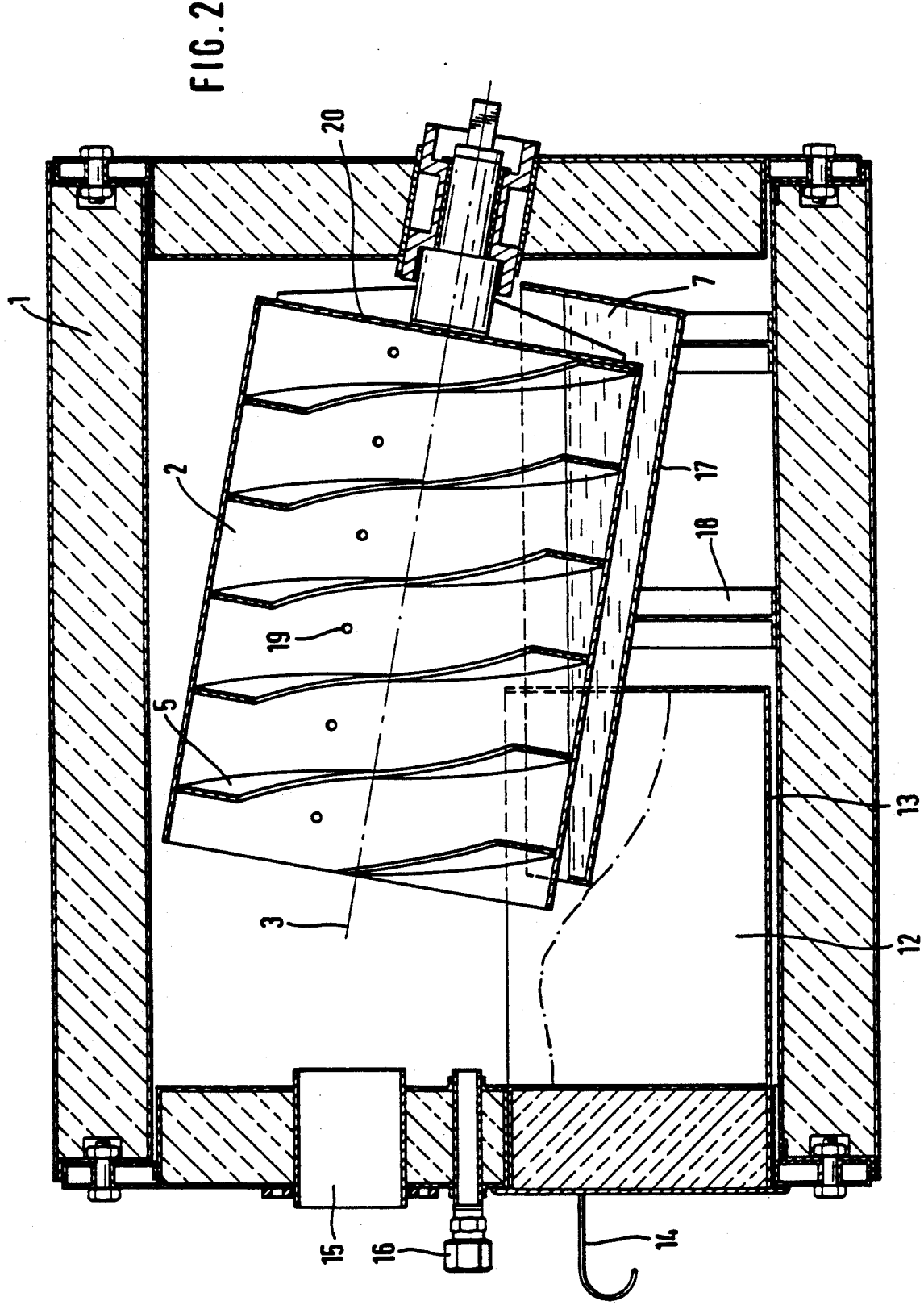

DEVICE TO FREEZE FREE-FLOWING AND POURABLE SUBSTANCES

BACKGROUND OF INVENTION

The invention relates to a device to freeze free-flowing and pourable substances. As a rule, free-flowing and pourable substances are frozen in that the substances, for example, in the form of drops or grains, are placed directly into a bath consisting of a low-boiling liquefied gas, usually nitrogen, and then frozen in this bath. Conveyor belts are used to transport the substances through such immersion baths and to remove the frozen materials from the immersion baths. Such a device is disclosed in West German Patent No. 37 11 169. These devices are well-suited for continuous production on an industrial scale. However, the immersion bath with the appertaining conveyor belt takes up a great deal of space. For this reason, these units are operated as stationary installations. Consequently, cleaning and sterilizing these units involve complicated procedures. As a consequence, such units are not well-suited in the field of science and research on the contrary, small units are preferred in development and research laboratories.

SUMMARY OF INVENTION

The invention is based on the task of creating a device which can be used for freezing free-flowing and pourable substances by means of direct contact with a low-boiling liquefied gas and which is compact and mobile and can be completely sterilized without overly complicated procedures.

Thus, instead of the stretched-out immersion bath with the appertaining conveyor belt, the device according to the invention has a rotatable hollow cylinder which does not contain any other mechanically moved parts. The transportation through the liquefied gas bath is done by means of a ribbon screw installed on the inner wall of the hollow cylinder. The dwell time of the substances to be frozen in the bath consisting of low-boiling liquefied gas is determined for the most part by the rotational speed of the hollow cylinder. Thus, the dwell time can be pre-specified. This makes it possible to freeze the substances in a controlled manner. Whereas the commonly employed immersion baths with conveyor belts cannot be built below a certain minimum size due to design-related reasons, the device according to the invention can have a very small and compact design. It can be easily transported and set up in different areas. The entire device can be kept so small that it can be sterilized in a commercially available autoclave, together with the insulated housing which surrounds the hollow cylinder. Since, aside from the rotatable hollow cylinder, there are no other mechanically moved parts, the device is virtually wear-free and not very prone to malfunctions. For this reason, it is very well-suited for use in science and research. It can be operated continuously or it also easily allows batchwise operation, as is commonly found in research facilities.

THE DRAWINGS

FIG. 1 is a schematic illustration showing the basic principle of the invention; and FIG. 2 shows an assembly drawing of an embodiment of the invention.

DETAILED DESCRIPTION

Figure 1:
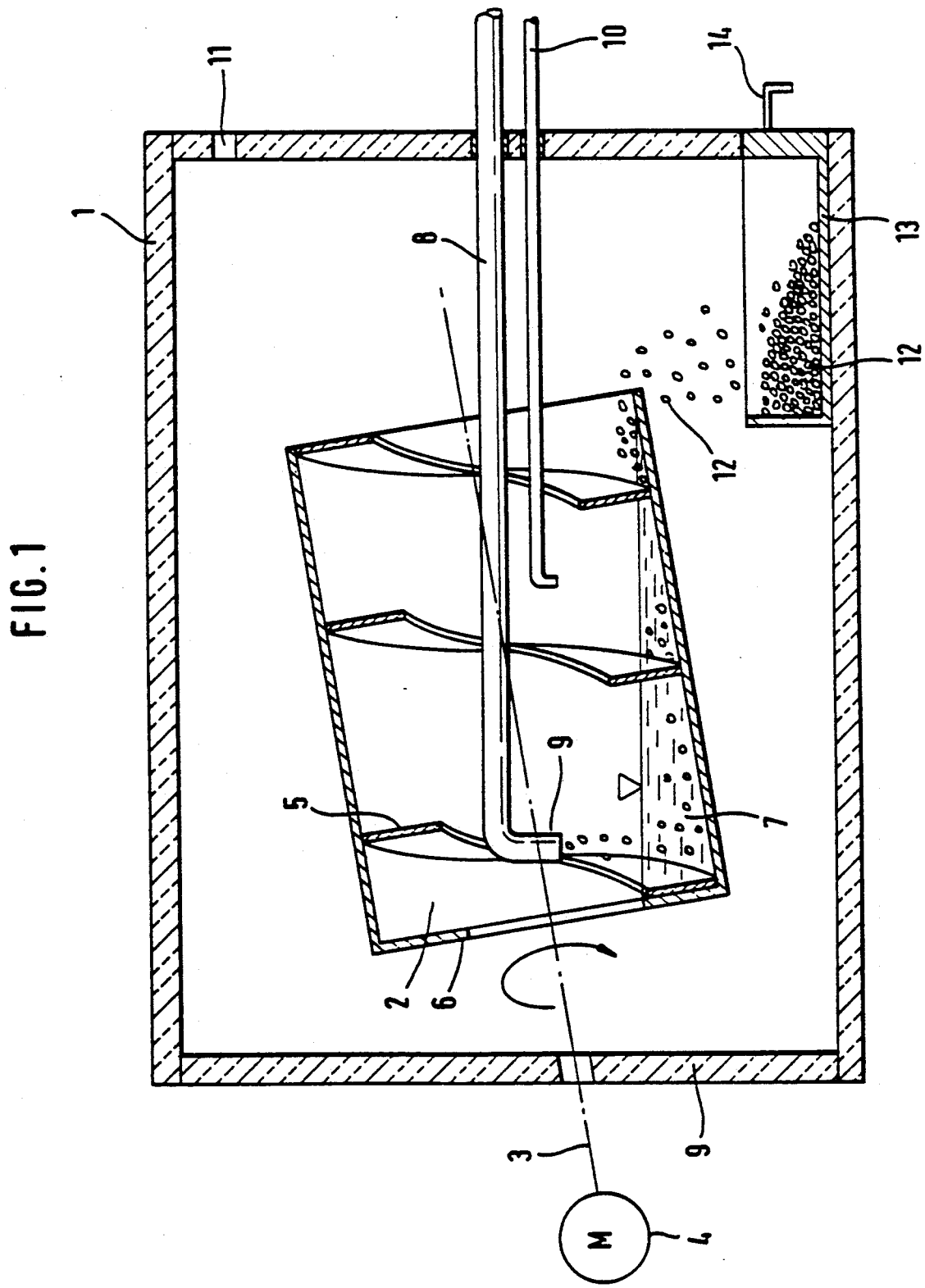

The same reference numbers were used for the same parts in the following description for the embodiments according to FIGS. 1 and 2. The device shown in FIG. 1 consists of an insulated housing 1 which, according to the invention, contains a rotatable hollow cylinder 2. The rotational axis 3 of the hollow cylinder 2 is tilted with respect to the horizontal plane, and it is driven by a motor 4 located outside of the insulated housing 1. There is a ribbon screw 5 attached to the inner wall of the hollow cylinder 2. A ring 6 forms the bottom of the hollow cylinder 2. A bath 7 consisting of liquefied nitrogen or liquid cryogen is maintained in the hollow cylinder 2. The depth of the bath 7 is determined by the tilted position of the hollow cylinder 2 and by the opening of the ring 6. The liquid to be frozen is fed via the line 8, which can also be a vacuum-insulated pipe. The feed mechanism 9 for the substances to be frozen is located directly above the lowest point of the bath 7. The liquid nitrogen is fed via a line 10, while the evaporated nitrogen flows out via a opening 11 in the insulated housing 1. Particularly in the case of small devices, the opening 11 can be dispensed with, provided that there are sufficient alternative escape routes, for example, in the area of the inlet of line 8 into the housing 1.

The substances to be frozen, for instance, drops of liquid, which come out of the feed mechanism 9 and enter the bath 7, are deep-frozen in the bath 7. The dwell time in the bath 7 is determined for the most part by the rotational speed of the hollow cylinder 2. As a consequence, it is easily possible to freeze the substances in a controlled manner for a pre-specified freezing time. The ribbon screw 5 can have boreholes which allow the liquid nitrogen to flow through the ribbon screw 5. Conveyed by the ribbon screw 5, the substances to be frozen gradually emerge from the hollow cylinder 2 and are collected in the form of frozen pellets 12 in a box 13. Once the box 13 is full or a batch has been frozen, it is removed from the insulated housing 1 by means of the handle 14 and further processed.

FIG. 2 shows a device according to the invention which is used in actual practice. Analogously to the embodiment in accordance with FIG. 1, it consists of the insulated housing 1, which is made up of segments, the rotatable hollow cylinder 2 having a tilted rotational axis 3 and ribbon screw 5 as well as the box 13 with the handle 14. The opening 15 serves to feed the substances to be frozen by means of a vacuum-insulated pipe (not shown here) having a feed mechanism, while the connection 16 serves to feed the liquid nitrogen by means of a pipe (likewise not shown here).

The essential difference to the embodiment according to FIG. 1 lies in the design of the bath 7 consisting of liquid nitrogen. For this purpose, there is a tray 17 which is held by supports 128 and which surrounds the lower part of the rotatable hollow cylinder 2. The tray 17 holds the bath 7 consisting of liquid nitrogen. In the wall of the hollow cylinder 2, there are boreholes 19, through which the liquid nitrogen can penetrate the inside of the hollow cylinder 2. This embodiment entails the special advantage that it is possible to easily keep the level of liquid constant in the hollow cylinder 2 by keeping the level of liquid in the tray 7 constant. Well known and proven devices (not shown in the drawing) can be employed for this purpose. For this reason, the bottom 20 of the hollow cylinder 2 is closed, since, unlike in the embodiment according to FIG. 1, it does not serve to control the level of the bath liquid.

Naturally, the device according to the invention is not restricted to the use of liquid nitrogen as the refrigerant. Thus, for instance, liquefied gases which have a substantially lower boiling point can also be used as the refrigerant. This is particularly advantageous in the case of research and development laboratories. Conversely, the device according to the invention can also be employed without any refrigerant in special cases. Instead of the refrigerant, a chemical solution serves as the bath such as, for example, calcium chloride, which is used to cross-link alginates, or else a solvent in which cross-linking takes place photochemically.

With devices to freeze free-flowing and pourable substances by means of direct contact with a low-boiling liquefied gas, it is often the case that the substances are carried on a conveyor belt through a bath consisting of the liquefied gas. Although these devices are well-suited for continuous production on an industrial scale, they take up a great deal of space. For scientific operations, for instance, preference is given to small devices which are easy to sterilize. Such a device consists of an insulated housing 1 containing a rotatable hollow cylinder 2, whose rotational axis 3 is tilted with respect to the horizontal plane and on whose inner wall there is a ribbon screw 5. The bath 7 consisting of a low-boiling, liquefied gas such as, for example, nitrogen, is located in the hollow cylinder. The feed mechanism 9 for the substances to be frozen is located above the lowest point of the bath.

What is claimed is:

1. In a device to freeze free-flowing and pourable substances in a bath consisting of a liquid cryogen, in which the bath is located inside an insulated housing which has openings which serve to introduce the substances to be frozen and the liquid cryogen as well as to remove the frozen substances, the improvement being in that said bath is located inside a rotatable hollow cylinder, said rotatable hollow cylinder being mounted completely within said insulated housing, said cylinder having a rotational axis tilted with respect to the horizontal plane whereby said cylinder has a low end and a high end, said low end being the feed end of said cylinder, said high end being the outlet end of said cylinder, a feed mechanism at said low end for feeding the substances to be frozen at said low end, said bath being in said low end, said cylinder having an inner wall, a ribbon screw being on said inner wall for upwardly conveying the substances to be frozen to said outlet end for discharge from said cylinder, bath retaining means at said low end of said cylinder extending above said inner wall at the lowest point of said low end, said bath retaining means comprising a ring mounted to said low end extending radially inwardly of said inner wall to create a dam for holding said bath at said low end in accordance with the radially inward dimension of said ring, said ring extending radially inwardly by a distance less than the radius of said cylinder, and said cylinder being tilted at a shallow angle with the lowest portion of said high end being below the axial center of said low end and with said bath extending substantially the entire length of said cylinder.

2. In a device to freeze free-flowing and pourable substances in a bath consisting of a liquid cryogen, in which the bath is located inside an insulated housing which has opening which serve to introduce the substances to be frozen and the liquid cryogen as well as to remove the frozen substances, the improvement being in that said bath is located inside a rotatable hollow cylinder, said rotatable hollow cylinder being mounted completely within said insulated housing, said cylinder having a rotational axis tilted with respect to the horizontal plane whereby said cylinder has a low end and a high end, said low end being the feed end of said cylinder, said high end being the outlet end of said cylinder, a feed mechanism at said low end for feeding the substances to be frozen at said low end, said bath being in said low end, said cylinder having an inner wall, a ribbon screw being on said inner wall for upwardly conveying the substances to be frozen to said outlet end for discharge from said cylinder, bath retaining means at said low end of said cylinder extending above said inner wall at the lowest point of said low end, said bath retaining means comprising a tray mounted below said cylinder and at least partially around said low end of said cylinder, said tray communicating with the interior of said cylinder by holes through the wall of said cylinder, and said bath being held in said tray and in said low end of said cylinder.

3. Device according to claim 2, characterized by a means to keep the level of said bath in said tray constant.

* * * * *